United States Patent

[11] 3,581,021

[72] Inventor Carl S. Pettit
Box 164, Sweethome, Ark. 72164

[21] Appl. No. 734,130
[22] Filed June 3, 1968
[45] Patented May 25, 1971

[54] CONDITION RESPONSIVE AUTOMATIC DIALING APPARATUS
1 Claim, 10 Drawing Figs.

[52] U.S. Cl. 179/90
[51] Int. Cl. H04m 1/44
[50] Field of Search 179/90 (ADO), 90 (CI), 90 (B), 5

[56] References Cited
UNITED STATES PATENTS 3,268,670 8/1966 Shadrick 179/90
2,929,884 3/1960 Verdesca 179/90

FOREIGN PATENTS 450,055 2/1949 Italy 179/90

*Primary Examiner*—Kathleen H. Claffy
*Assistant Examiner*—Tom D'Amico
*Attorney*—Colton and Stone

ABSTRACT: The disclosure relates to an automatic telephone dialing system wherein a driven rotary input member is rotated about a fixed axis adjacent the dial of a conventional telephone to, sequentially, rotate the dial in a clockwise direction and release the same for return to its initial rest position to dial a preselected multiple digit number. The rotation and release of the dial is effected by providing a plurality of spaced driven engaging elements positioned about the periphery of the input member which are rotated, seriatim, into and out of drive engaging relationship with a drive engaging element mounted on the dial. The number, length and spacing of the spaced drive engaging elements correspond to a preselected multiple digit telephone number.

INVENTOR

CARL S. PETTIT

BY Colton & Stone

ATTORNEYS.

INVENTOR
CARL S. PETTIT
BY Colton & Stone
ATTORNEY

CONDITION RESPONSIVE AUTOMATIC DIALING APPARATUS

BACKGROUND OF THE INVENTION

The invention relates to a condition responsive automated telephone dialing system.

Although a number of prior art systems have been proposed for automatic dialing which rely on the rather simple expedient of effecting direct driving engagement between a single driving member and a telephone dial, as exemplified by U.S. Pat. No. 3,342,938; such systems have limited utility and have not enjoyed wide-spread acceptance because of their inability to dial any preselected multiply digit number as opposed to dialing the "operator".

Previously known systems for automatically dialing a preselected multiple digit number have required a relatively large number of moving parts and have, accordingly, been quite expensive to purchase and maintain. Additionally, such multiple digit dialing systems have required substantial time and expense to change the preselected number to be dialed. U.S. Pat. No. 2,202,366 is exemplary of this latter class of dialing systems.

SUMMARY OF THE INVENTION

It is a primary object of the invention to provide a condition responsive automatic dialing system requiring only a single moving part to dial any preselected multiple digit telephone number.

Another object of the invention is to provide an automatic dialing system wherein the preselected multiple digit number may be readily changed, without disassembly of the apparatus, by an inexperienced person in a matter of a few minutes.

It is among the further objects of the invention to provide an automatic dialing system that is simple in operation, consists of relatively few moving parts and is economical to manufacture; that is compact in size; that consists of component parts readily separable from the conventional dial telephone whereby the usual function of the telephone is not impaired; and is adaptable for usage with a wide variety of related systems such as alarms and transmitting recorders to report information relative to an alarm condition.

The foregoing and other objects are achieved by the herein disclosed invention directed to a condition responsive automatic telephone dialing system. The condition sensed may be any that is susceptible of providing an electrical output and is herein described as a fire and/or intruder responsive alarm of conventional design.

The automatic dialing system includes a drive transmitting attachment secured to the dial of a telephone for rotation therewith. A rotary disc member, which is adapted to be rotated by a constant speed motor in response to an electrical output derived from a condition responsive alarm, is provided with a plurality of spaced drive engaging elements positioned about the periphery thereof. These elements correspond in number, spacing and arcuate length to a preselected multiple digit telephone number that is to be automatically dialed in response to the alarm condition in a manner that will be subsequently explained.

DESCRIPTION OF THE PREFERRED EMBODIMENTS

Figure 1:
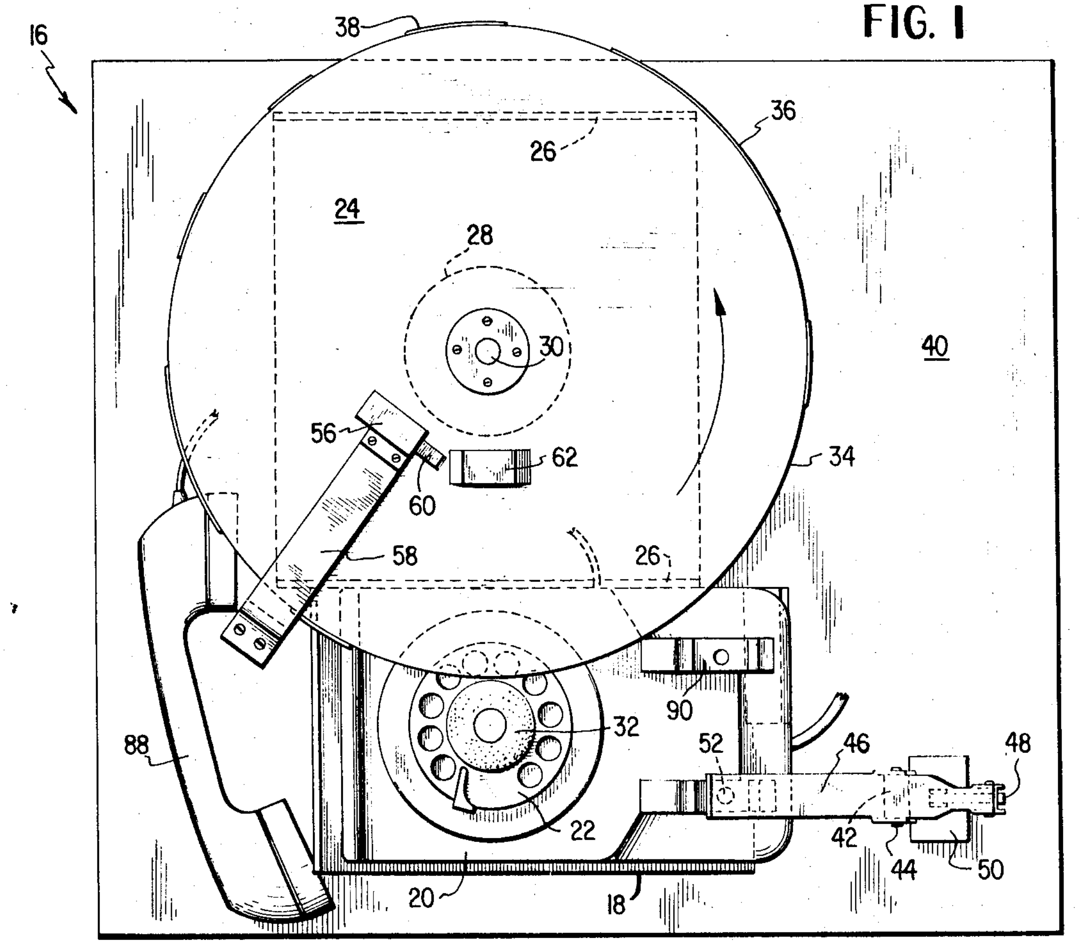
FIG. 1 is a top plan view of the mechanical dialing portion of the automatic dialing system positioned adjacent a conventional dial telephone.
Figure 2:
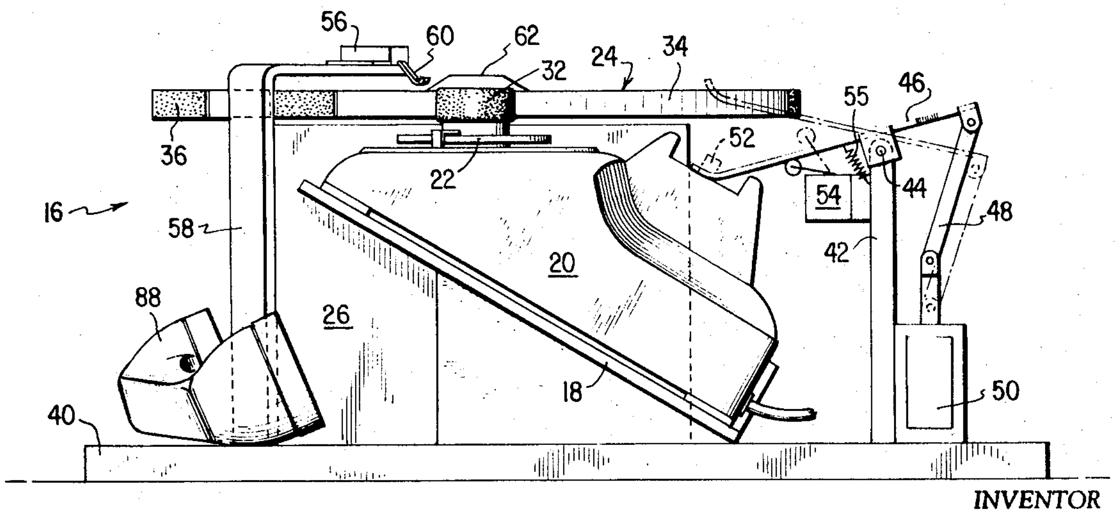
FIG. 2 is a side elevational view of the apparatus shown in FIG. 1.
Figure 3:
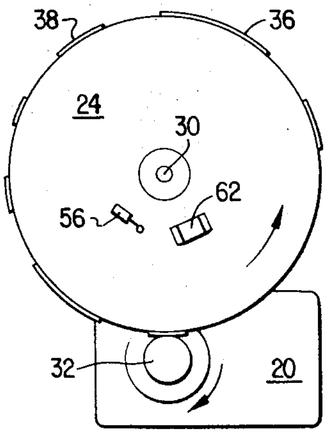
FIGS. 3—5 illustrate, diagrammatically, sequential steps in the dialing of a multiple digit number.
Figure 4:
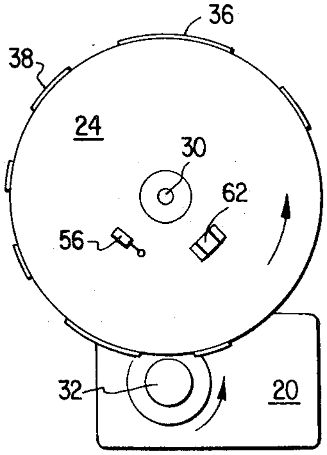
Figure 5:
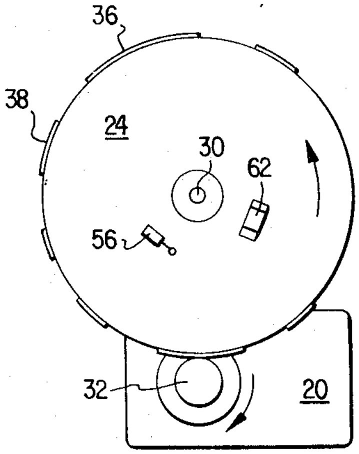

A preferred embodiment of the automatic dialing system, depicted in FIGS. 1—9, includes a condition responsive detection apparatus 10 of conventional design, a detection circuit 12, a motor control circuit 14 and a dialing mechanism 16. The dialing mechanism includes a support rack 18 on which a conventional dial telephone 20 is disposed with the dial 22 thereof in proximity to a driven input member, or dialing disc, 24 supported for rotation about a fixed axis by brackets 26. A constant speed electric motor 28 is secured to shaft 30 of disc 24 to rotate the same about the axis thereof.

A drive transmitting attachment 32, herein illustrated as a rubber coated cylinder, is fixedly secured to the central portion of telephone dial 22 for rotation therewith about the axis of the dial. The central portion of the dial may be removed and attachment 32 substituted therefore or the attachment may be secured directly to the central portion of the dial as by use of an epoxy resin or the like.

Disc 24 is supported for rotation in a horizontal plane and support rack 18 is positioned as such an angle relative thereto that telephone dial 22 is supported for rotation in a plane below and parallel to the plane of disc 24. When telephone 20 is positioned on rack 18, attachment 32 extends into the plane of disc 24 and is closely spaced from the periphery thereof. Thus, the circular paths of movement defined by the outer peripheries of the drive transmitting attachment 32 and disc 24 define closely adjacent nonintersecting paths.

Disc 24 has secured to the outer periphery 34 thereof, as by an adhesive or the like, a plurality of arcuately spaced friction drive transmitting elements 36 having an outer roughened surface, such as strips of sand paper or the like, which correspond in number to the number of digits that are to be dialed. In the usual case of a seven digit number, seven strips 36 would be attached to the periphery of disc 24. The thickness of strips 36 exceeds the spacing between the outer peripheries of disc 24 and dialing attachment 32. Accordingly, the circular paths of movement defined by the outer peripheries of the drive transmitting attachment 32 and strips 36 intersect in a generally tangential relationship as clearly shown in FIGS. 3 and 5. It will be apparent that as one of the strips 36 is rotated into frictional contact with attachment 32, the attachment and dial 22 will be rotated thereby and the degree of rotation imparted to the dial will be dependent upon the arcuate length of the particular driving strip 36 engaging the attachment. Thus, if the digit "five" is to be dialed by a particular strip 38, the arcuate length of strip 38 will be such as to rotate the dial to the appropriate position, or approximately 180°. In this case, the length of strip 38 would be chosen to be one-half the circumference of attachment 32.

It will be recalled that the disc periphery 34 is spaced from the dial attachment; accordingly, as the disc rotates a particular strip past the dial, the frictional driving engagement is terminated and the dial is free to return to its rest position during that period of time while a spacing between strips 36 is adjacent the attachment prior to its engagement by the next spaced strip to dial another digit.

Disc 24 is designed to be rotated at a constant r.p.m. to dial the selected number. Accordingly, it is necessary that the spacing between strips 36 be so correlated with the speed of disc rotation and the return speed of dial 22 to its rest position that the dial is fully returned to its rest position before another strip engages the dialing attachment.

Inasmuch as both the return speed of the dial and the rotational speed of the disc may be easily determined, it is a simple matter to provide peripheral markings on disc 24 to facilitate the determination of the lengths and spacings of strips 36 to encode any preselected multiple digit number on the disc.

Base plate 40 of dialing mechanism 16 includes an upstanding rigid bracket 42, positioned adjacent rack 18, whose upper end provides a pivotal fulcrum 44 for lever 46. One end of lever 46 is pivotally attached to an actuating arm 48 pivotally secured to the core of solenoid 50 which is secured to bracket 42. The free end of lever 46 is disposed to engage one of the telephone receiver push buttons 52 to depress and release the same as the core of solenoid 50 is extended and retracted. A microswitch 54 is mounted on bracket 42 for actuation by lever 46 concomitantly with the actuation thereby of telephone push button 52 under the influence of lever spring 55 and solenoid 50.

A second microswitch 56 is supported on a generally inverted L-shaped bracket 58 in proximity to the upper surface of disc 24 in position for the actuating arm 60 thereof to be engaged by an abutment 62, carried on the upper surface of disc 24, once during each revolution of the disc. The purpose of microswitches 54 and 56 is to control the cyclic operation of motor 28 by energizing the same in response to an electrical input signal derived from a conventional alarm circuit embodied in detection apparatus 10 and to deenergize the motor after the preselected number is dialed. The manner in which this control is effected is schematically illustrated in FIGS. 6—9.

Motor circuit 14 includes a conventional AC source 64 and parallel upper and lower blind conducting bridges 66, 68 terminating in end terminals 70, 74 and 72, 76, respectively. Microswitch 54 is mounted for movement between the two positions shown in FIGS. 6 and 7 interconnecting circuit terminal 78 with bridge terminals 72 and 70, respectively. Similarly, microswitch 56 is positioned to provide a conductive path between circuit terminal 80 and one or the other of bridge terminals 74, 76.

Switch 82 is actuated by linkage 84 controlled by a solenoid, not shown, integrated with condition responsive apparatus 10.

Figure 6:
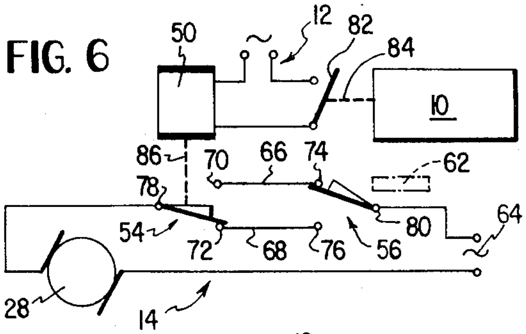
FIGS. 6—9 illustrate, schematically the manner in which a motor circuit is controlled to effect the automatic dialing.
Figure 7:
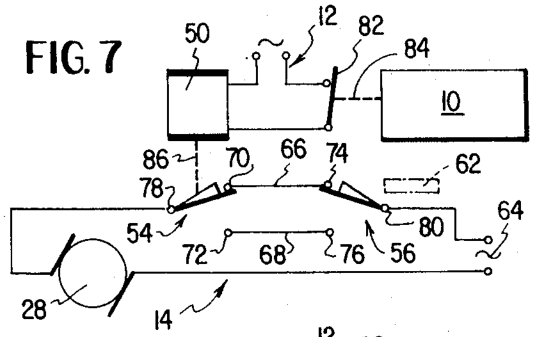
Figure 8:
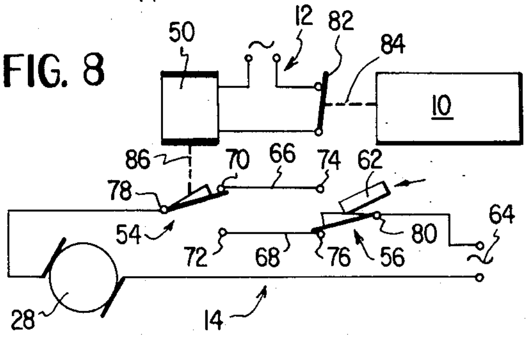
Figure 9:
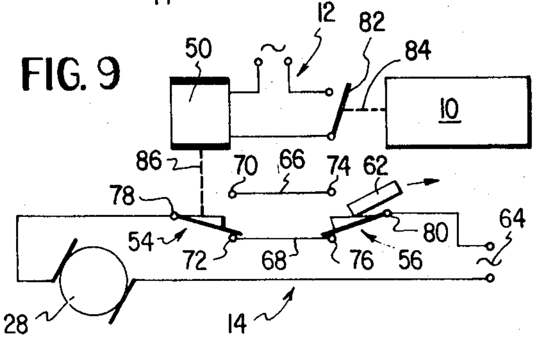

Solenoid 50 controls microswitch 54 through linkage 44, 46, 48 as previously explained, which linkage is illustrated in FIGS. 6—9 by phantom line 86. The actuation of microswitch 56 between the positions shown in FIGS. 7 and 8 is effected by the engagement and disengagement of microswitch actuating arm 60 with abutment 62. The normal position of microswitch 56 is shown in FIGS. 6 and 7 and abutment 62 is schematically illustrated in phantom lines in these FIGS. The engagement of microswitch actuating arm 60 by the abutment is schematically illustrated in FIGS. 8 and 9; the arrow shown in FIG. 8 indicating the movement of abutment 62 into engagement with arm 60 and the arrow of FIG. 9 illustrating the initial movement of the abutment away from arm 60 but prior to disengagement therefrom.

The sequence of operations involved in the control of motor circuit 14 is initiated by the closing of switch 82 in response to an alarm condition detected by apparatus 10. The initial condition of the circuit is shown in FIG. 6 where switch 82 of detection circuit 12 is open and motor circuit 14 is open due to the fact that microswitches 54 and 56 are engaged with nonconnected bridge terminals 72, 74. When switch 82 closes in response to an alarm condition, detection circuit 12 is completed to activate solenoid 50 and move microswitch 54 to contact bridge terminal 70, as in FIG. 7, to complete the motor circuit and start rotation of the motor and disc 24. It will be recalled that linkage 44, 46, 48 which actuates microswitch 54 also releases telephone push button 52. When the linkage indicated by phantom line 86 and microswitch 54 are in the position of FIG. 6, push button 52 is depressed as though telephone receiver 88 were on the cradle 90 and, in the FIG. 7 position, the push button is released and the telephone is ready to be dialed. The motor circuit condition of FIG. 7 remains the same while disc 24 rotates, counterclockwise, from the position of FIG. 1 through nearly 360 until such time as abutment 62 engages arm 60 which is the circuit condition schematically illustrated in FIG. 8. The motor circuit is again opened when abutment 62 forces microswitch 56 to move out of contact with bridge 66 and into contact with bridge 68.

With the motor stopped and the motor circuit open, as indicated in FIG. 8, the telephone number dialed will continue to ring until the same is answered. Any suitable reporting apparatus of conventional design may be used to report the location of the dialing system to the monitoring individual or system at the number dialed. Prior art systems that are suitable for such usage may take the form of those disclosed in any of the following U.S. Pat. No. 2,830,119; 3,170,990 and 3,342,938. It is, of course, obvious that in order to reduce the costs involved in utilizing the system herein disclosed, the transmitting or reporting apparatus may be omitted. In such event, the user of the system would merely inform the monitoring service of the hours during which the system is to be monitored and a telephone call to the monitoring service during those hours from the telephone number of phone 20, as would be readily determined from a manual switchboard type arrangement, would be indicative of the presence of a condition to which apparatus 10 is set to respond.

In order to "reset" the dialing system, it is necessary to again establish the circuit condition of FIG. 6. This is automatically accomplished when detection apparatus 10 is reset at which time detection circuit 12 is opened by switch 82. Opening of switch 82 allows spring 55 to move microswitch 54 into contact with bridge terminal 72, completing the motor circuit as shown in FIG. 9 and again energizing the motor to rotate disc 24 until abutment 62 moves out of engagement with arm 60 which is the physical position of FIG. 1 and the circuit position of FIG. 6.

In operation, telephone receiver 88 is removed from its cradle and the telephone positioned on rack 18 with lever 46 depressing push button 52. With electrical power applied to detection circuit 12 as by plugging into a conventional outlet or activating a suitable switch, not shown; the physical location of the dialing mechanism is as shown in FIG. 1 and the circuits are in the condition of FIG. 6. When an alarm condition is sensed by apparatus 10, switch 82 closes, the motor circuit is completed and disc 24 is rotated to dial the multiple digit telephone number encoded on disc periphery 34. After the last strip 36 passes attachment 28, abutment 62 engages arm 60 to deenergize the motor and disc 24 stops with abutment 62 depressing arm 60 to break the circuit in the manner shown in FIG. 8. After the alarm condition has been noted and detection apparatus 10 is reset, detection circuit 12 is again opened and lever 46 is returned to the solid line position of FIG. 2 by spring 55 to position microswitch 54 in the position of FIG. 9 whereupon motor circuit 14 is again completed and the disc is rotated a small amount until abutment 62 disengages arm 60 at which time the disc stops and the circuit conditions of FIG. 6 are restored.

Figure 10:
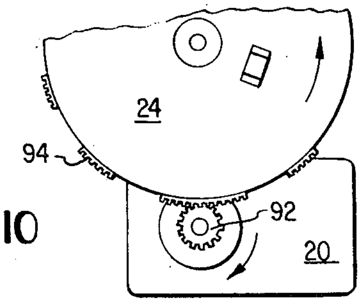
FIG. 10 is a diagrammatic illustration of a second embodiment of the invention.

A second modification of the invention is illustrated in FIG. 10 where the friction drive attachment secured to the telephone dial is replaced by a gear 92 and friction drive strips 36 are replaced by gear segments 94. Otherwise, the operation of the embodiment fragmentarily illustrated in FIG. 10 is identical with that described in connection with FIGS. 1—9.

I claim:

1. Automatic telephone dialing apparatus comprising a telephone having a biased dial mounted thereon for driven rotation in a first direction about a dial axis and biased return rotation;

first drive transmitting means having a drive engaging periphery mounted coaxially with the dial for rotation therewith and defining a first circular path of movement;

second drive transmitting means including a disc having a plurality of coplanar arcuately spaced alternately positioned drive engaging means and nondrive sections thereon for driving the drive engaging periphery in the first direction and allowing the biased dial to return a plurality of times for dialing a multidigit number; and means mounting the drive engaging means and nondrive sections for rotary movement in a common plane with the drive engaging periphery into and out of driving engagement therewith;

the second drive transmitting means including a motor for rotating the disc to drive the drive engaging periphery in the first direction; and means for controlling the operation of the motor including means responsive to a condition for starting the motor;

means responsive to the completion of dialing the multidigit number for stopping the motor;

switch means having an actuator adjacent the disc;

a switch actuating element on the disc for rotation in a path of movement including the switch actuator for manipulating the same;

an electromechanical actuator;

condition sensing means for energizing the actuator upon presence of the condition;

second switch means operated by the actuator, the first mentioned and second switch means comprising double terminal switches; and circuit means for connection to a source of power including the first and second switch means for energizing the motor, the circuit means including a pair of isolated conductive bridges having terminals at one end thereof for engagement with the first switch means and terminals at the other end thereof for engagement with the second switch means;

the first switch means being normally out of engagement with one of the bridges and the second switch means being normally in engagement with the one bridge.